United States Patent [19]
Maeda

[11] Patent Number: 5,969,877
[45] Date of Patent: Oct. 19, 1999

[54] DUAL WAVELENGTH F-THETA SCAN LENS

[75] Inventor: Patrick Y. Maeda, Mountain View, Calif.

[73] Assignee: Xerox Corporation, Stamford, Conn.

[21] Appl. No.: 08/979,163

[22] Filed: Nov. 26, 1997

[51] Int. Cl.$^6$ .................................................... G02B 3/00
[52] U.S. Cl. ........................................ 359/662; 359/206
[58] Field of Search .................... 359/662, 206, 359/205, 204

[56] References Cited

U.S. PATENT DOCUMENTS

| | | | |
|---|---|---|---|
| 5,111,325 | 5/1992 | DeJager | 359/662 |
| 5,404,247 | 4/1995 | Cobb et al. | 359/662 |
| 5,550,668 | 8/1996 | Appel et al. | 359/204 |
| 5,691,835 | 11/1997 | Iizuka | 359/662 |
| 5,835,280 | 11/1998 | Griffith | 359/662 |

*Primary Examiner*—Georgia Epps
*Assistant Examiner*—Jordan M. Schwartz
*Attorney, Agent, or Firm*—William Propp

[57] ABSTRACT

An F-theta scan lens for a dual beam, dual wavelength raster output scanning system (ROS) has four lens elements with the third and fourth lenses forming a doublet having a negative refractive power. This four-element F-theta scan lens corrects for axial chromatic aberration and lateral chromatic aberration for both wavelengths and provides scan linearity.

3 Claims, 3 Drawing Sheets

DUAL WAVELENGTH F-THETA SCAN LENS

BACKGROUND OF THE INVENTION

This invention relates to a f-theta scan lens for an optical scanning system and, more particularly, a f-theta scan lens for a dual wavelength raster output scanning system (ROS).

Raster output scanners conventionally have a reflective multifaceted polygon mirror that is rotated about its central axis to repeatedly sweep an intensity modulated beam across a photosensitive medium in a line scanning direction (also know as the scan direction) while the recording medium is being advanced in an orthogonal or "process" direction (also known as the slow scan direction) such that the beam scans the recording medium in accordance with a raster scanning pattern.

The raster output scanners in general have F-theta lenses in the optical path between the rotating polygon mirror and the scanning surface of the photosensitive medium. The light beam will be deflected at a constant angular velocity from the rotating mirror which the F-theta lens optically modifies to scan the surface at a constant velocity. These ROS systems in the past have employed F-theta scan lenses designed for use with monochromatic light sources and, therefore, were not designed to compensate for the effects of chromatic aberration.

A multiple beam, multiple wavelength ROS 10 of the prior art is shown in FIG. 1. The multiple beam laser 12 consisting of a pair of laser diodes (not shown) emits two beam 14 and 16, each having a different wavelength. The beams 14 and 16 are collimated by collimator 18. The light beams then continue through a single element cross-scan cylinder lens 20 which focuses them in the cross-scan direction onto the reflective facet 22 of the rotating polygon mirror 24. After reflection and scanning from the facet 22, the two beams 14 and 16 pass through the F-theta scan lens 26. The F-theta scan lens is shown as a three-element lens 28, 30 and 32.

Subsequently, the wobble correction optical elements 34 reimage the focused beams 14 and 16 reflected from polygon facet 22 onto the photoreceptor plane 36 at predetermined positions, independently of the polygon angle error or tilt of the facet 22. The wobble correction optics 34 can consist of a pair of fold mirrors 38 and 40 and a cylindrical mirror 42 to image the focused beams 14 and 16 on the plane 6. Such compensation is possible because the focused beams are stationary "objects" for the F-theta scan lens 26 and the wobble correction optics 34. Although, due to polygon tilt, or wobble, the beams 14 and 16 are reflected to different positions of the post-polygon optics aperture for each different facet of the rotating polygon, the beams 14 and 16 are imaged to the same positions on the PR plane 36.

"Bow" is a measure of distortion in the cross-scan direction of the scan line from one end of the scan to the other. Bow may be calculated by taking the average of the cross-scan heights at the extreme ends of the scanline then subtracting the cross-scan height at the center of scan. In a multiple beam system, each light source emitting a beam has its own bow curve. It is the maximum difference in the bow curves between the multiple light sources in a given system that defines the "differential bow".

The optical design must achieve F-theta correction in the optics to ensure the "scan linearity." Scan linearity is the measure of how equally spaced the spots are written in the scan direction across the entire scanline. Typical scan linearity curves start at zero position error at one end of a scan having a positive lobe of position error, cross the center of scan with zero position error and then have a negative lobe of position error toward the other end of the scan. Scan linearity curves may have image placement errors of zero at several locations across the scanline. Ideally, the curve would be at zero across the entire scanline.

There are two color aberrations in the lens of a multiple beam, multiple wavelength ROS that must be corrected or compensated for: (1) longitudinal or axial chromatic aberration and (2) tangential or lateral chromatic aberration. Axial chromatic aberration causes light of different wavelengths to come to a focus at different distances back from the lens. Lateral chromatic aberration is the variation in image height of focused spots of light having different wavelengths, taken at a specified focal plane.

With the advent of multiple wavelength laser diodes as light sources, multiple beam ROS optical systems that use these light sources must have scan lenses that enable precise and accurate scanning with beams of different wavelengths. In these lenses, both axial chromatic aberration and lateral chromatic aberration must be corrected to a high degree. Lateral chromatic aberration, also known as chromatic aberration of magnification, must be corrected to within a small fraction of a pixel throughout the entire scan to be effective.

Accordingly, there is a need for a diffraction limited F-theta scan lens for a multiple beam, multiple wavelength ROS that exhibits very little lateral chromatic aberration and very little field curvature along the main scanning direction and that has a longitudinal chromatic aberration that is smaller than the depth of focus of the beam at the image plane.

SUMMARY OF THE INVENTION

The present invention provides an F-theta scan lens for a dual beam, dual wavelength raster output scanning system (ROS) which has four lens elements with the third and fourth lenses forming a doublet having a negative refractive power. This four-element F-theta scan lens corrects for axial chromatic aberration and lateral chromatic aberration for both wavelengths and provides scan linearity. The four single lenses of the F-theta scan lens, located in order 1 to 4 from the side of the polygon light deflector, satisfy the following conditions: vd1<vd2, vd3<vd4, R11<0, R12<0,0.9<R11/R12<1.1, R31<0, R32<0, 0.1<R31/R32<0.5, f2>0, f3<0, f4>0, fG1>0, and fG2<0, where vd1, vd2, vd3 and vd4 denote the Abbe dispersion numbers of the first, second, third and fourth lenses, R11 and R12 denote the radii of curvature of the first and second surfaces of the first lens, R31 and R32 denote the radii of curvature of the first and second surfaces of the third lens, f2, f2, f3 and f4 denote the focal lengths of the first, second, third and fourth lenses, fG1 denotes the focal length for the combination of the first and second lenses and fG2 denotes the focal length for the combination of the third and fourth lenses.

Other objects and attainments together with a fuller understanding of the invention will become apparent and appreciated by referring to the following description and claims taken in conjunction with the accompanying drawings.

DETAILED DESCRIPTION OF THE PREFERRED EMBODIMENTS

Figure 1:
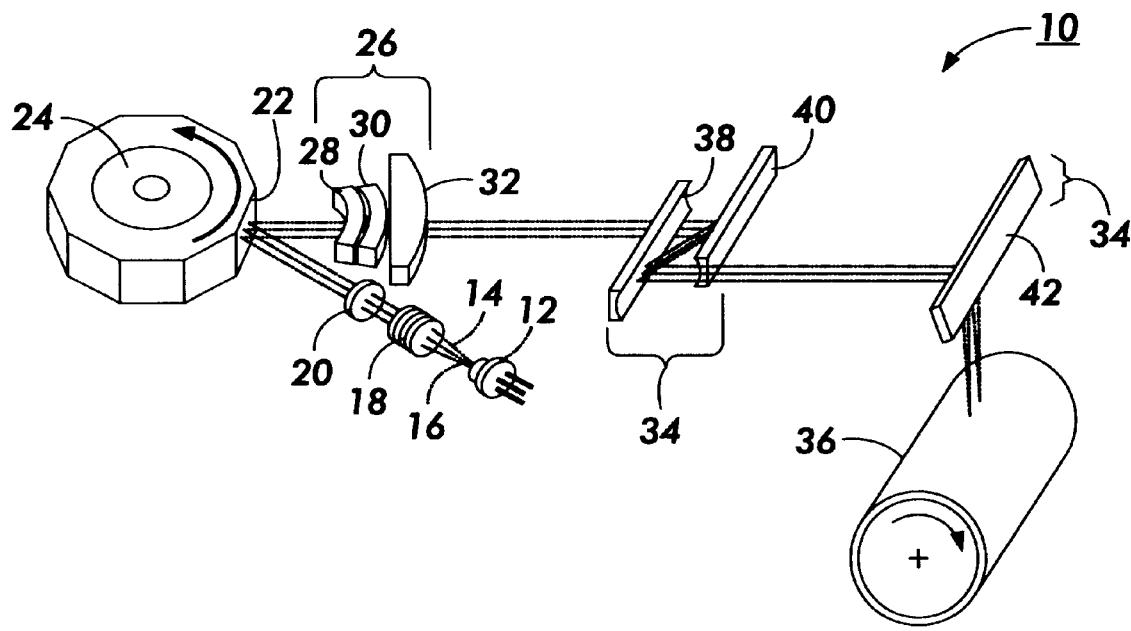
FIG. 1 is a side view of a prior art dual beam raster output scanning system (ROS).
Figure 2:
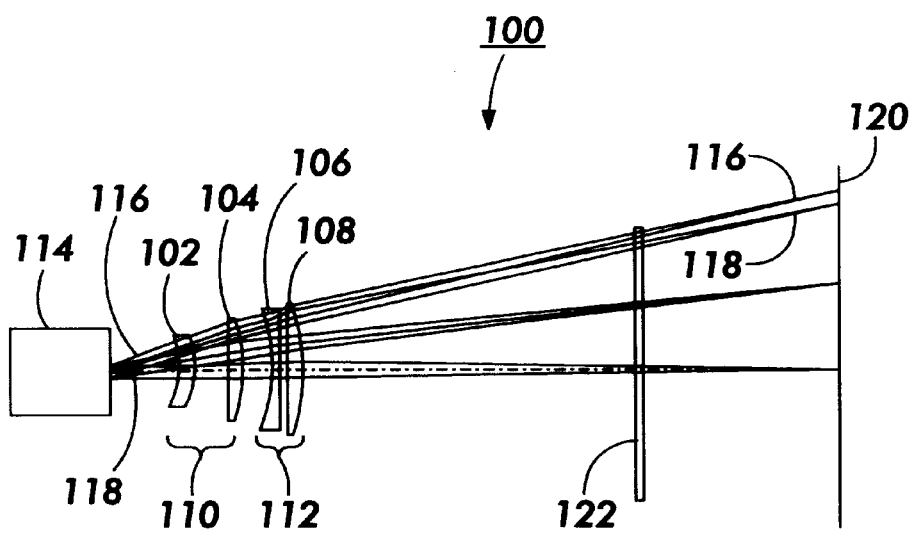
FIG. 2 is a cross-sectional side view of the dual wavelength F-theta scan lens of the present invention.

Reference is now made to FIG. 2 which illustrates a dual wavelength F-theta scan lens 100 in accordance to the present invention.

The dual wavelength F-theta scan lens 100 has a first lens 102, a second lens 104, a third lens 106 and a fourth lens 108. The first and second lenses 102 and 104 form a first lens group, G1, 110. This first lens group 110 is a widely spaced doublet type of lens. The third and fourth lens 106 and 108 form a second lens group, G2, 112. This second lens group 112 of the third and fourth lenses is a separated doublet type of lens of negative refractive power.

The first lens 102 is concave-convex. Both lens surface radii are within 10% to 15% of being concentric, and therefore the lens 102 is weakly negative. The second lens 104 is concave-convex, the third lens 106 is concave-convex, and the fourth lens 108 is plano-convex. The focal length of the first and third lenses 102 and 106 are negative, while the second and fourth lenses 104 and 108 have positive focal lengths.

As part of a raster output system (ROS), a light deflector 114, such as a rotating polygon mirror, deflects two beams 116 and 118 of different wavelengths through the four element F-theta scan lens 100. The F-theta scan lens focuses or converges the beams 116 and 118 onto the scanning surface 120, such as a photoreceptor. The F-theta scan lens causes the focused beams 116 and 118 to scan the surface 120 at approximately constant velocity.

An output window 122 may also be provided in the optical path of the two beams 116 and 118 between the F-theta scan lens 100 and the scanning surface 120 to help the F-theta scan lens compensate for the lateral chromatic aberration.

Within the F-theta scan lens 100, the first lens 102 is closest to the light deflector 114 and furthest from the scanning surface 120 and first in the optical path of the two beams 116 and 118. The second lens 104 is second in the optical path of the two beams 116 and 118 and the third lens 106 is third in the optical path of the two beams 116 and 118. The fourth lens 108 is closest to the scanning surface 120 and furthest from the light deflector 114 and last in the optical path of the two beam 116 and 118.

The first surface of each lens is the surface closest to the light deflector 114 and the incident surface for that lens in the optical path of the two beams 116 and 118. The second surface of each lens is the surface closest to the scanning surface 120 and exit surface for that lens in the optical path of the two beams 116 and 118.

This dual wavelength F-theta scan lens 100 satisfies the following conditions:

| | |
|---|---|
| $vd1 < vd2$ | [Equation 1] |
| $vd3 < vd4$ | [Equation 2] |
| $R11 < 0$ | [Equation 3] |
| $R12 < 0$ | [Equation 4] |
| $0.9 < R11/R12 < 1.1$ | [Equation 5] |
| $R31 < 0$ | [Equation 6] |
| $R32 < 0$ | [Equation 7] |
| $0.1 < R31/R32 < 0.5$ | [Equation 8] |
| $f1 < 0$ | [Equation 9] |
| $f2 > 0$ | [Equation 10] |
| $f3 < 0$ | [Equation 11] |
| $f4 > 0$ | [Equation 12] |
| $fG1 > 0$ | [Equation 12] |
| $fG2 < 0$ | [Equation 13] | where vd1, vd2, vd3 and vd4 denote the Abbe dispersion numbers of the first, second, third and fourth lenses, R11 and R12 denote the radii of curvature of the first and second surfaces of the first lens, R31 and R32 denote the radii of curvature of the first and second surfaces of the third lens, f1, f2, f3 and f4 denote the focal lengths of the first, second, third and fourth lenses, fG1 denotes the focal length for the combination of the first and second lenses and fG2 denotes the focal length for the combination of the third and fourth lenses.

The Abbe number specifies the dispersion characteristics of the lens material chosen for the lens design. The dispersion characteristics are need for chromatic aberration correction. Generally, a small Abbe number indicates a large variation in refractive index of the lens material with the wavelength of the light beam.

An example of an F-Theta scan lens 100 which satisfies the conditions of Equations 1 to 13 is in a dual beam Raster Output scanning system where the wavelength of the first beam is 834 nm and the wavelength of the second beam is 671 nm. The scan angle is 18.735° with a scan line length of 393.7 mm and a F-theta scan lens focal length of 602.1275 mm.

The four element F-theta scan lens 100 would have R radii of curvature, T lens thickness or distance to the next lens surface, nd of the n-refractive index of the glass measured at the d-wavelength which is 587.56 nm, and vd of Abbe numbers:

TABLE I

| LENS # | SUR-FACE # | RADIUS (in mm) | THICKNESS OR DISTANCE (in mm) | ND | VD |
|---|---|---|---|---|---|
| | | | 80.800000 | | |
| Lens 1 | S1 | −82.84539 | 21.537000 | 1.75520 | 27.58 |
| | S2 | −92.94078 | | | |
| | | | 42.614211 | | |
| Lens 2 | S3 | −2547.45468 | 15.000000 | 1.51680 | 64.17 |
| | S4 | −186.63798 | | | |
| | | | 35.229408 | | |
| Lens 3 | S5 | −156.85082 | 12.700000 | 1.72825 | 28.41 |
| | S6 | −580.38285 | | | |
| | | | 5.000000 | | |
| Lens 4 | S7 | INFINITY | 18.000000 | 1.51680 | 64.17 |
| | S8 | −234.27339 | | | |
| | | | 391.776551 | | |
| Output Window | S9 | INFINITY | 5.842000 | 1.51680 | 64.17 |
| | S10 | INFINITY | | | |
| | | | 234.081950 | | |

Figure 3:
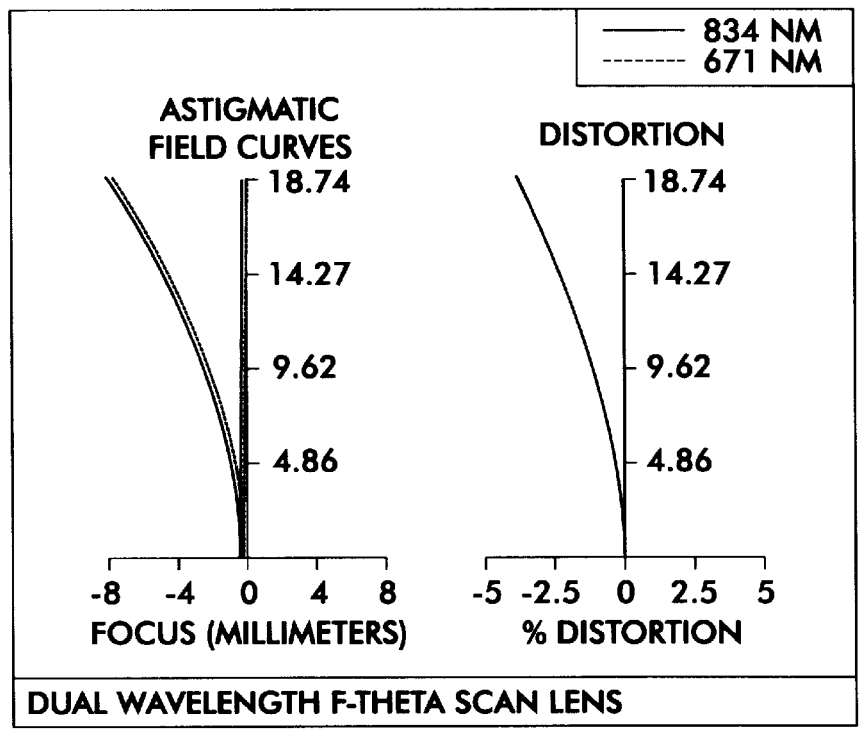
FIG. 3 is a graph illustrating field curvature and distortion of the dual wavelength F-theta scan lens of FIG. 2.
Figure 4:
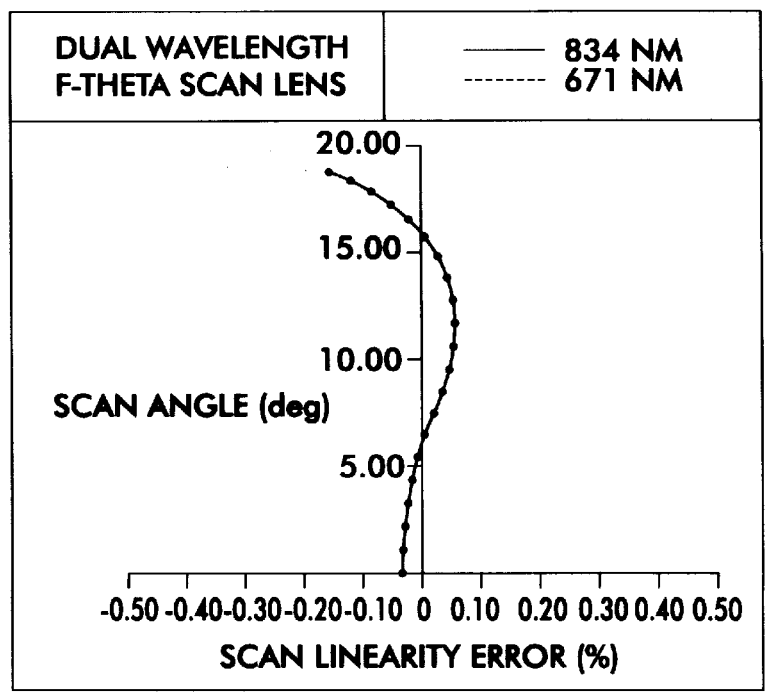
FIG. 4 is a graph illustrating scan linearity of the dual wavelength F-theta scan lens of FIG. 2.
Figure 5:
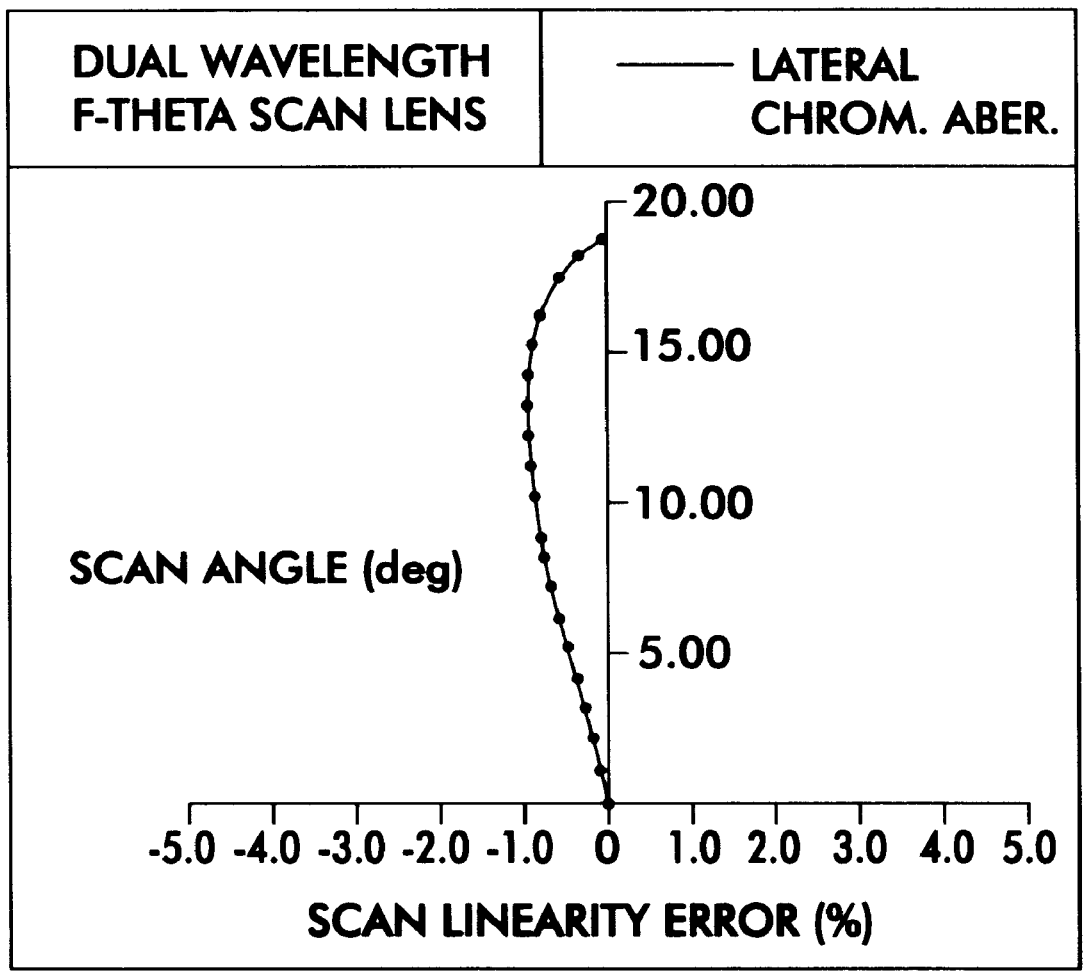
FIG. 5 is a graph illustrating chromatic scan error of the dual wavelength F-theta scan lens of FIG. 2.

The resulting F-theta scan lens is diffraction limited. As shown in FIG. 3, the field curvature of the F-theta scan lens along the main scanning direction is less than 0.41 mm. As, shown in FIG. 4, the scan linearity of the F-theta scan lens is less than 0.16 percent. As shown in FIG. 5, the lateral chromatic aberration of the F-theta scan lens over the entire scan is less than 1.0 micron.

One of the unique features of this particular invention is that fG2 is negative. In general, F-theta scan lenses are composed of a plurality of lenses with the lens or lens group furthest away from the deflector always being positive. Lenses 106 and 108 of the F-theta scan lens 100 form a seperated doublet type of lens of negative refractive power. This feature, relative to the prior art, gives this lens a unique design for an F-theta scan lens.

When used with a wobble correction cylinder mirror, this four element F-theta scan lens 100 provides differential bow correction, wobble correction, and small cross-scan field curvature.

With the addition of a wobble correction cylindrical mirror to the post-polygon optics, and if lens surfaces S3, S4 and S5 are cylindrical and lens surface S7 is a cross-scan cylindrical surface, the following results are achieved:
Beam Separation of 254 microns
Differential Bow is less than 2 microns
Wobble is less than 1 micron
Field Curvature along the cross-scan direction is less than 1.0 mm.

It should be appreciated that the reflecting surface need not be a rotating polygon facet. The surface can also be a reflecting surface associated with a galvanometer, a holographic scanner or a micromodulator as are well-known in the art. The rotating polygon may have any number of facets, from one to as many as necessary to obtain the desired system characteristics. Further, the reflecting surface, whether a rotating polygon, a micromodulator, or any other known type of scanning mechanism, can be of a type that is underfilled by the light beams, or overfilled by the light beams, or critically filled. In addition, although not illustrated, an enclosure with a window or similar means for preventing contamination of the facet surface or surfaces may be employed to isolate the reflecting surface or surfaces.

It should be noted that while illustrated as a dual-beam ROS for simplicity, the raster output scanning optical system 100 is equally applicable to systems having three or more laser diodes and laser beams. It should also be noted that in the case of an odd number of lasers, the chief ray of the center laser would be located on the cross scan optical axis.

While the invention has been described in conjunction with specific embodiments, it is evident to those skilled in the art that many alternatives, modifications, and variations will be apparent in light of the foregoing description. Accordingly, the invention is intended to embrace all such alternatives, modifications, and variations that fall within the spirit and scope of the appended claims.

What is claimed is:

1. An F-theta scan lens for use in a dual beam raster output scanning (ROS) system, said F-theta scan lens being located in the optical paths of a first beam having a first wavelength and a second beam having a second wavelength between a deflector and a scanning surface, said deflector deflecting said first beam and said second beam to scan said scanning surface, said F-theta scan lens in order from said deflector to said scanning surface comprising:

a first lens,
   a second lens,
   a third lens, and
   a fourth lens, wherein said third lens and said fourth lens form a doublet having a negative refractive power which further fulfills the following conditions:
   $vd1<vd2$,
   $vd3<vd4$,
   $R11<0$,
   $R12<0$,
   $0.9<R11/R12<1.1$,
   $R31<0$,
   $R32<0$,
   $0.1<R31/R32<0.5$,
   $f1<0$,
   $f2>0$,
   $f3<0$,
   $f4>0$,
   $fG1>0$,
   $fG2<0$, where $vd1$, $vd2$, $vd3$ and $vd4$ denote the Abbe dispersion numbers of said first, second, third and fourth lenses respectively, R11 and R12 denote the radii of curvature of said first and second surfaces of the first lens respectively in order from said deflector to said scanning surface, R31 and R32 denote the radii of curvature of said first and second surfaces of the third lens respectively in order from said deflector to said scanning surface, f1, f2, f3 and f4 denote the focal lengths of said first, second, third and fourth lenses respectively, fG1 denotes the focal length for the combination of said first and second lenses and fG2 denotes the focal length for the combination of said third and fourth lenses.

2. The F-theta scan lens of claim 1 further comprising an output window between said fourth lens and said surface.

3. The F-theta scan lens of claim 1 wherein
   said first lens is a distance of 80.8 mm from said deflector, said first lens having a first surface with a radius of curvature of −82.84539 mm, a thickness of 21.537 mm and a second surface with a radius of curvature of −92.94078 mm,
   said second lens is a distance of 42.614211 mm from said first lens, said second lens having a first surface with a radius of curvature of −2547.45468 mm, a thickness of 15 mm and a second surface with a radius of curvature of −186.63798 mm,
   said third lens is a distance of 35.229408 mm from said second lens, said third lens having a first surface with a radius of curvature of −156.85082 mm, a thickness of 12.7 mm and a second surface with a radius of curvature of −580.38285 mm, and
   said fourth lens is a distance of 5 mm from said third lens, said fourth lens having a first surface with a radius of curvature of infinity, a thickness of 18 mm and a second surface with a radius of curvature of −234.27339 mm, wherein said first surface and said second surface of each of said first, second, third and fourth lenses are respectively in order from said deflector to said scanning surface.

* * * * *